United States Patent [19]

Albersheim

[11] 4,308,538
[45] Dec. 29, 1981

[54] AICBM DECOY RESOLUTION BY COHERENT INTEGRATION

[75] Inventor: Walter J. Albersheim, Waban, Mass.

[73] Assignee: The United States of America as represented by the Secretary of the Army, Washington, D.C.

[21] Appl. No.: 538,167

[22] Filed: Mar. 22, 1966

[51] Int. Cl.³ .................. G01S 13/28; G10S 13/44
[52] U.S. Cl. .................. 343/16 M; 343/17.2 R; 343/17.2 PC
[58] Field of Search .............. 343/16.1, 17.2, 17.2 PC, 343/165 D, 16 M, 17.2 R

[56] References Cited

U.S. PATENT DOCUMENTS

| | | | |
|---|---|---|---|
| 2,624,876 | 1/1953 | Dicke | 343/13 R |
| 2,929,056 | 3/1960 | Page | 343/7.4 |
| 3,153,234 | 10/1964 | Begeman et al. | 343/16 R |
| 3,201,702 | 10/1965 | Hanulec et al. | 343/17.2 X |
| 3,223,999 | 12/1965 | Groginsky | 343/17.2 X |

Primary Examiner—Malcolm F. Hubler
Attorney, Agent, or Firm—Nathan Edelberg; Robert P. Gibson; Robert C. Sims

[57] ABSTRACT

A receiver in a radar system has two feed horns which supply a hybrid. The hybrid sums the amplitude of the signals from the feed horns at its first output and subtracts the signals at its second output. The outputs are each converted to I.F. by mixers, de-chirped, and then are coherently integrated. The integrated output of the difference is fed to a servo for tracking. The integrated output of the sum is fed through a control unit to control the beat signal of the mixers.

7 Claims, 2 Drawing Figures

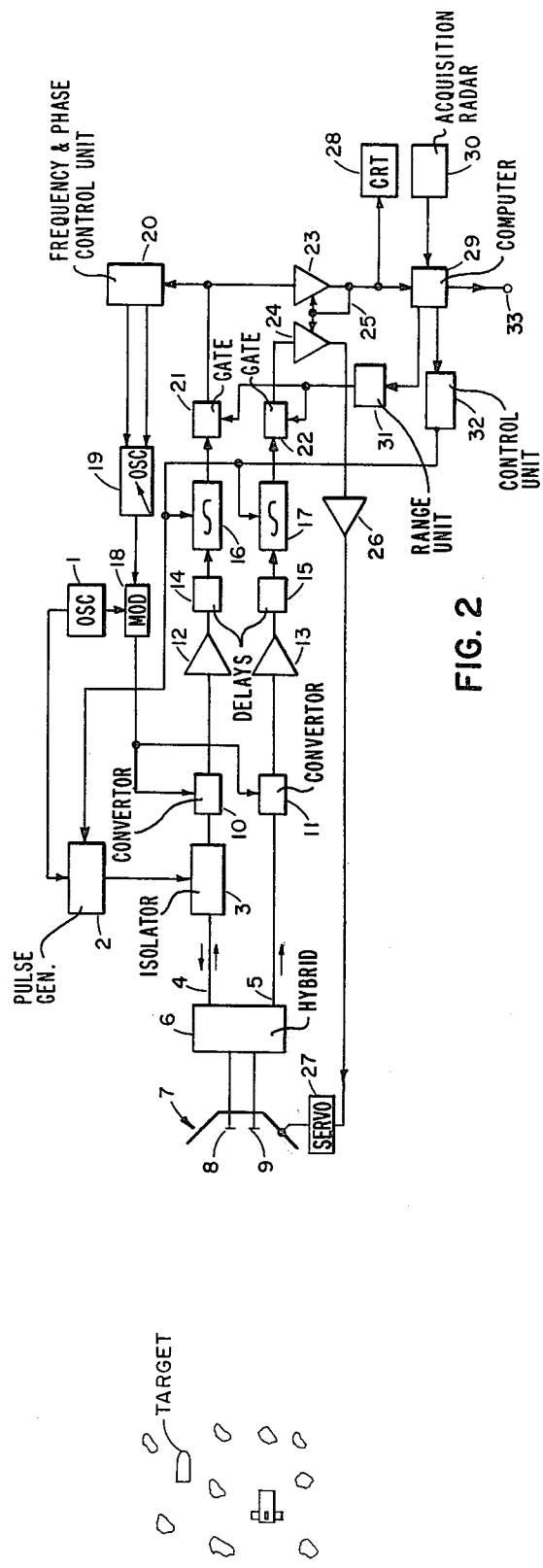
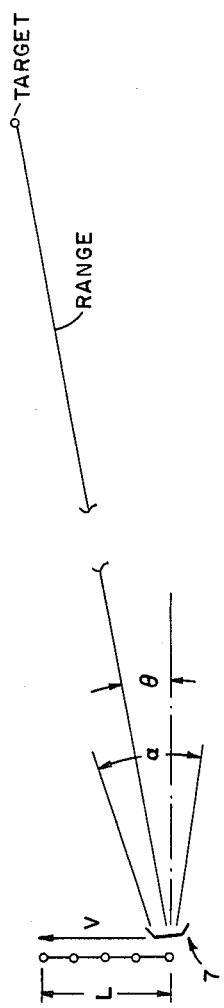
FIG. 2
FIG. 1

AICBM DECOY RESOLUTION BY COHERENT INTEGRATION

Prior art radar systems have been designed to obtain high discrimination in angle and in range by monopulse of "beam splitting" methods. These methods are valid only if there is only one point target inside the "pulse volume" (pulse length times the cross section of the radar beam). These systems fail when there is more than one target in this volume. Ballistic missiles present at least two targets: the warhead and the last rocket stage. At an oblique angle of observation these may have nearly equal slant range. If many decoys are added, it becomes increasingly probable that monopulse beam sharpening fails because of simultaneous reception of plural target and decoy echoes. It is known that monopulse produces sharp localization of single point targets but does not improve resolution of extended or multiple targets.

It is an object of this invention to provide a system for obtaining high decoy resolution.

A further object of the present invention is to use coherent integration to get a high decoy target resolution.

A still further object of the invention is to provide a system which will have high resolution of targets even when the targets have nearly equal slant ranges.

The invention further resides in and is characterized by various novel features of construction, combinations, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing.

The drawing, which forms a part of the specification, presents the same reference characters to represent corresponding and like parts throughout the drawing, and wherein:

FIG. 1 is a representation of the principle of coherent integration in a radar system, and FIG. 2 shows a block diagram illustrating one preferred form of the present invention.

In ground surveillance high angular resolution is obtained by coherent integration of successive pulse echoes from sidelooking antennas of airborne radars. The conditions of such surveillance flights are illustrated by FIG. 1. The surveying plane flies with a constant velocity $v$. The antenna 7 is fixed to the plane and points approximately sideways. The deviation of its beam from a 90° angle relative to the flight direction is $\theta$. The pulse interval of the radar is $\tau$, and its beam width is $\alpha$. A number n of successive pulse intervals are stored in a delay line and added (or integrated) in phase. This requires phase coherence between pulses, or at least between each pulse and the local oscillator for the time interval of the most distant echo; hence the name coherent integration. The beam sharpening obtained by this method may be interpreted in two ways. First, as the beam characteristic of a long "synthetic antenna", and second, as the effect of a narrow band pass filter that accepts only Doppler frequencies corresponding to a narrow angle.

Coherent integration over n pulse intervals means that n echoes are superimposed in the same phase relationship as if they had been received simultaneously. The time T required to accumulate n pulses is $$T = n\tau. \qquad (1)$$

The plane covers the distance L during this time and $$L = Tv = n\tau v.$$

The signals are therefore received at n points spaced $\tau v$; therefore forming a linear array of receiving elements with a total length L. When the number of array elements n is large, it approximates a single synthetic antenna of length L.

The effects and methods used in ground surveillance by an airborne radar are based on the relative velocity between the target and the radar. Hence, instead of moving the radar at approximately constant speed past a complex fixed target, one may obtain the same type of resolution if a complex fixed target moves with approximately constant speed past a fixed radar. An ICBM cluster of warhead, decoys, last stage rocket, and fragments is such a target.

In free space the cluster describes Keplerian ellipses that deviate only slightly from a straight line. The deviation being due to gravity and another deviation due to air resistance occuring during re-entry of the cluster. For refined measurements these deviations can be compensated, like near field distortions, by phase or frequency modulation of a local oscillator or by equivalent means. A further difference from the present invention and ground surveillance is that in ground surveillance all parts of the terrain have the same vector velocity relative to the plane, whereas in a missile cluster there is a slight dispersion in vector velocity as well as in angle. The effect of this velocity dispersion on the resolution will, for all practical purposes, be resolved by the range gate of the target tracking radar.

OPERATION

The coherent integration target tracking radar is shown in FIG. 2. The radar signals are derived from a stable local oscillator 1 and preferably transmitted as Chirp pulses. These are fed to the antenna 7 by way of a hybrid 6 and the sum channel 4 to two feed horns 8 and 9. The receiving circuits are protected from the transmitter pulses by one of more isolators 3. Echo pulses from the target enter the antenna are picked up by feedhorns 8 and 9, and transmitted to the hybrid. Hybrid 6 adds the magnitude of the signals to present at its output 4 and subtracts the magnitude of the signals to present at its output 5. The sum signal is converted to IF by convertor 10, and the difference signal is converted by the convertor 11. The beat frequency is derived from the sum of the local oscillator frequency 1 and the variable frequency oscillator 19 which are combined in modulator 18. The IF signals are preamplified at 12 and 13 and dechirped, if a Chirp radar system is used, by delay equalizers 14 and 15. A predetermined plurality of pulses are then coherently integrated by units 16 and 17. These integrator units may be delay lines with positive feedback at a loop gain slightly lower than unity. Preferably each of the integrators 16 and 17 may consist of two delay lines whose inputs differ in phase by 90° and whose outputs are added in quadrature.

The outputs of the coherent integrators are gated by range gates 21 and 22. The gated sum channel output adjusts the frequency of variable oscillator 19 by means of a frequency and phase control unit 20 so that the sum channel output is maximized. This makes the beat frequency equal to the sum of local oscillator frequency plus the frequency caused by the doppler shift. The oscillator 19 follows the rate of change of the doppler shift, thus eliminating near field distortion. Such frequency control automatically cancels near field effect and permits longer integration and higher resolutions.

The outputs of sum and difference channels pass through amplifiers 23 and 24 whose gain is controlled by a common bias 25 which is derived from the output of the sum amplifier 23. Thus the output of 23 is held approximately constant. The output of 24 constitutes an error voltage of the antenna direction and the target. This error voltage is boosted by an amplifier 26 to activate a tracking servo motor 27. It should be noted that the two input signals giving rise to the error voltage do not have the antenna beamwidth of a single return (of 0.6°) but have separately sharpened (to 0.1 mil) by coherent integration.

The output of the sum amplifier may be displayed in the conventional manner by a CRT or other data display 28. In addition it is fed into a data processing computer 29. This computer utilizes not only internal data but, especially in the early stages of track initiation, rough range and angular data supplied by an acquisition radar and other auxiliary sources 30. From these data the computer derives the range and range rate which by means of the range control unit 31 sets the range gates 21 and 22. It also selects a pulse repetition rate that keeps a suitable distance between the target and the nearest dead zone. This selection is impressed upon control unit 32 which adjusts pulse generator 2 and the delay length of coherent integrators 16 and 17. The above named functions of the data processing unit 29 require that it compute a target track which will be available at a data output 33 for transmission to LDC's or batteries.

Since the primary beam of the antenna remains as wide as before, the radar is capable of seeing and distinguishing several targets or decoys at one time. To do this requires multiple receivers, including coherent integrators. The multiplexing can be done in angle (in the direction of relative target motion), by providing several doppler filters of the desired separation.

A multiplicity of frequency filters may also help to establish target "signatures". A tumbling, tuned decoy jack may modulate the signal at a high enough rate to be picked up in two or more adjacent frequency channels, whereas the nose cone is likely to flicker more slowly. Multiplexing can also be done in range by providing several range gates and one receiver per gate.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may some times be used to advantage without a corresponding use of other features.

It is, therefore, to be understood that within the scope of the appended claims the invention may be practiced otherwise than as specifically described. Accordingly, it is desired that the scope of the invention be limited only by the appended claims.

I claim:

1. A radar system comprising receiver means receiving pulse echoes from a reflecting means and having a first and a second output, said first output being the sum of pulse echoes received by two spaced means in said receiver means, said second output being the difference between the magnitude of the pulse echoes received by said two spaced means, first and second channel units connected to said first and second outputs respectively, and each channel unit comprising a converter means connected to one output of said receiver means for converting the output to I. F. signals, integrating means connected to an output of the converter means for coherently integrating data from a predetermined number of pulse echoes, and utilization means connected to an output of said integrating means.

2. A radar system as set forth in claim 1, wherein said utilization means of said second channel unit is a servo system connected to be responsive to the output of the integrating means and being connected to said receiver means so as to position it for tracking.

3. A radar system as set forth in claim 1, wherein said converter means comprises a mixer for each channel, said mixer having a first input connected to an output of said receiver means and having its output connected to an input of its respective integrating means, a variable beat frequency signal means having outputs connected to a second input of each of said mixers so that the frequency output of each mixer is the difference in the frequencies applied to its inputs, and a frequency control unit connected between a control input of said variable beat signal means and the output of said integrating means of the first channel so as to control the frequency output of the beat signal means in accordance to doppler shift of the echo pulse.

4. A radar system as set forth in claim 3, wherein said variable beat frequency signal means comprises a local oscillator, a variable oscillator, and a modulator; outputs of said oscillators being connected to the modulator so as to be combined thereby; outputs of the modulator being connected to said second input of each mixer; and said variable oscillator having a control input connected to the output of said frequency control unit.

5. A radar system as set forth in claim 1, wherein said receiver means is an antenna; and said two spaced means are feed horns by said antenna.

6. A radar system as set forth in claim 5, wherein said pulse echoes are chirp returns; and each channel contains a de-chirp means connected between the output of said converter means and the input of said integrating means.

7. A radar system as set forth in claim 6 wherein said utilization means of said second channel unit is a servo system connected to be responsive to the output of the integrating means and being connected to said antenna so as to position it for tracking.

* * * * *